United States Patent
Hashem et al.

(10) Patent No.: US 7,756,520 B2
(45) Date of Patent: Jul. 13, 2010

(54) PACKET COMMUNICATION SYSTEM WITH DUAL CANDIDATE SETS FOR INDEPENDENT MANAGEMENT OF UPLINK AND DOWNLINK TRANSMISSIONS

(75) Inventors: Bassam M. Hashem, Nepean (CA); Shalini S. Periyalwar, Ottawa (CA); Yoon Chae Cheong, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 2636 days.

(21) Appl. No.: 09/977,991

(22) Filed: Oct. 17, 2001

(65) Prior Publication Data
US 2003/0073455 A1   Apr. 17, 2003

(51) Int. Cl.
 *H04W 72/00* (2009.01)
(52) U.S. Cl. ............... 455/450; 455/451; 455/452.2
(58) Field of Classification Search ............. 455/522, 455/525, 513, 515, 466, 428, 430, 561, 524, 455/450–455, 436–444; 370/341, 329–332
See application file for complete search history.

(56) References Cited

U.S. PATENT DOCUMENTS

| | | | |
|---|---|---|---|
| 5,487,174 A * | 1/1996 | Persson | 455/444 |
| 6,212,386 B1 * | 4/2001 | Briere et al. | 455/447 |
| 6,295,450 B1 * | 9/2001 | Iyer et al. | 455/436 |
| 6,584,325 B1 * | 6/2003 | Shakhgildian | 455/525 |
| 6,654,612 B1 * | 11/2003 | Avidor et al. | 455/450 |
| 6,690,939 B1 * | 2/2004 | Jonsson et al. | 455/453 |
| 6,804,213 B2 * | 10/2004 | Zimmermann et al. | 370/332 |
| 6,862,449 B1 * | 3/2005 | Mohebbi et al. | 455/437 |
| 6,996,083 B1 * | 2/2006 | Balachandran et al. | 370/337 |
| 7,072,663 B2 * | 7/2006 | Ramos et al. | 455/453 |
| 2003/0050074 A1 * | 3/2003 | Kogiantis et al. | 455/453 |

\* cited by examiner

*Primary Examiner*—George Eng
*Assistant Examiner*—Nam Huynh (57) ABSTRACT

A method and apparatus are provided for selecting an optimum base station for communicating with a terminal in a wireless communication system. A base station controller stores two candidate sets for each terminal within communication range of the base stations controlled by the base station controller. One candidate set lists base stations for which the channel quality of the uplink channel between the base station and the terminal is acceptable for communication. The other candidate set lists base stations for which the channel quality of the downlink channel between is acceptable for communication. This allows the base station controller to take into account the predominant direction of traffic when assigning base stations for communication with the terminal.

15 Claims, 4 Drawing Sheets

PACKET COMMUNICATION SYSTEM WITH DUAL CANDIDATE SETS FOR INDEPENDENT MANAGEMENT OF UPLINK AND DOWNLINK TRANSMISSIONS

FIELD OF THE INVENTION

This invention relates to wireless communication systems, and more particularly to selection of optimum base stations within such systems.

BACKGROUND OF THE INVENTION

In wireless communication systems, a terminal (such as a mobile telephone or a fixed wireless access terminal) communicates with one of a number of base stations. However, the terminal need not always communicate with the same base station, and may switch base stations even during a call. The decision as to which base station to communicate with at any particular time will depend on the channel quality between each base station and the terminal. The channel quality will vary with each base station because of a number of geographic effects. For each base station, the geographic effects include: the distance between the terminal and the base station, which will affect the received signal strength; the number of intervening obstacles and terrain features between the terminal and the base station, resulting in shadowing; and reflections off nearby obstacles, resulting in multipath fading. The channel quality will also be affected by interference from other channels. The channel quality for each base station often varies with time as the interference varies. Variations in the channel quality may also occur due to varying geographic effects, particularly with mobile terminals for which the communication path between the terminal and each base station will vary quite quickly.

In order to determine the optimum base station for communication with a terminal, a base station controller (BSC) keeps track of a candidate set of base stations for each terminal. A candidate set is a list of base stations for which a channel quality sufficient for communication with the terminal has been measured for communication between the base station and the terminal. For each base station within communication range, the terminal determines the channel quality by measuring the strength of a pilot signal from the base station and reports the channel quality to the BSC via the base station. The BSC communicates with all of the base stations, and collects the channel qualities reported by the terminal for each base station. The BSC stores the identities of the base stations for which the channel quality is above a threshold necessary for adequate communication with the terminal. The base station identities form a candidate set for the terminal. The candidate set will vary with time, as the channel qualities change due to movement of the terminal or due to changing interference levels.

During a call, the BSC also maintains an active set for each terminal. An active set is a list of one or more base stations with which an active terminal is actually communicating (an active set may list more than one base station identity if the terminal communicates with more than one base station simultaneously, as in communication systems that employ Code Division Multiple Access). The initial active set for a terminal is determined by the BSC based upon the traffic load on each base station within the candidate set of the terminal, in an attempt to balance the loads on all base stations. If the channel quality between the terminal and a base station in the active set falls below a threshold (such as occurs when the terminal moves beyond the range of the base station) the BSC determines a new active set, and transmits the new active set to the terminal via the base stations.

As described above, the determination of the candidate set for a terminal is determined by the BSC based on the strength of the pilot signals received at the terminal from the various base stations. The strength of each pilot signal gives a measurement of the channel quality of the respective downlink channel. Alternatively, the candidate set can be determined on the basis of the channel quality of each uplink channel. A base station may determine the channel quality of the uplink channel by measuring the quality of the Random Access Channel when a terminal initiates a call, or by measuring the quality of the System Access Channel during a call. The base station reports the channel quality of the uplink channel to the BSC, which then updates the candidate set for the terminal.

A single candidate set is therefore maintained for each terminal, based either on the channel quality of the uplink channel or the channel quality of the downlink channel. However, since the uplink and the downlink use different channels, it is possible for a particular base station to be the optimum base station for traffic in one direction but not in the other direction. For voice traffic this is somewhat acceptable. Voice traffic is generally symmetric in that the volume of traffic in the uplink direction and in the downlink direction are comparable. This means that about 50% of the traffic will be using the optimum base station. However, as wireless communication systems evolve to become more data oriented, the volume of traffic will tend to become asymmetric. For example, handheld web browsers typically transfer much more traffic over the downlink than over the uplink. For an individual call, if the volume of traffic over the downlink is much greater than the volume of traffic over the uplink, it would be preferable to determine the optimum base station (or base stations) based on the channel qualities of the respective downlink channels. Similarly, if the volume of traffic over the uplink is much greater than the volume of traffic over the downlink, it would be preferable to determine the optimum base station (or base stations) based on the channel qualities of the respective uplink channels.

SUMMARY OF THE INVENTION

The present invention provides a method of selecting at least one base station for communicating with a terminal in a wireless communication system. An uplink candidate set listing at least one candidate uplink base station is stored. A downlink candidate set listing at least one candidate downlink base station is stored. The predominant direction of traffic with respect to the terminal is determined. If the predominant direction of traffic is in the uplink direction, at least one optimum base station from the uplink candidate set is selected. If the predominant direction of traffic is in the downlink direction, at least one optimum base station from the downlink candidate set is selected. In one embodiment, storage of the uplink candidate set may be accomplished by receiving a channel quality corresponding to a base station and determining whether the channel quality corresponds to an uplink channel. If the channel quality corresponds to an uplink channel, it is determined whether the base station is a candidate uplink base station. If the base station is a candidate uplink base station, the base station is placed in the uplink candidate set. If the base station is not a candidate uplink base station, the base station is removed from the uplink candidate set. The determination of whether the base station is a candidate uplink base station may determine that the base station is a candidate uplink base station if the channel quality is above a threshold. Similar embodiments apply to the storage of the downlink candidate set. In another embodiment, the selection of an optimum base station from either the uplink candidate set or the downlink candidate set selects one or more base stations having the lowest current load amongst the base stations in the appropriate candidate set.

The present invention also provides another method of selecting at least one base station for communicating with a terminal in a wireless communication system. An uplink candidate set listing at least one candidate uplink base station is stored. A downlink candidate set listing at least one candidate downlink base station is stored. At least one optimum uplink base station is selected from the uplink candidate set, and at least one optimum downlink base station is selected from the downlink candidate set. In one embodiment, storage of the uplink candidate set may be accomplished by receiving a channel quality corresponding to a base station and determining whether the channel quality corresponds to an uplink channel. If the channel quality corresponds to an uplink channel, it is determined whether the base station is a candidate uplink base station. If the base station is a candidate uplink base station, the base station is placed in the uplink candidate set. If the base station is not a candidate uplink base station, the base station is removed from the uplink candidate set. The determination of whether the base station is a candidate uplink base station may determine that the base station is a candidate uplink base station if the channel quality is above a threshold. Similar embodiments apply to the storage of the downlink candidate set. In another embodiment, the selection of an optimum base station from either the uplink candidate set or the downlink candidate set selects one or more base stations having the lowest current load amongst the base stations in the appropriate candidate set.

The system allows a base station controller to determine optimal base stations with which a terminal can communicate, taking into account differences in uplink requirements and downlink requirements. This allows the base station controller to determine the optimal base stations based on the anticipated predominant direction of traffic. This also allows the base station controller to determine separate optimal uplink base stations and optimal downlink base stations independently.

The invention may be implemented in any communication system that employs candidate sets and active sets to designate base stations for communication with a terminal. The invention is particularly advantageous in communication systems that carry traffic over an uplink channel and a downlink channel asymmetrically, such as communication systems that carry high rate data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
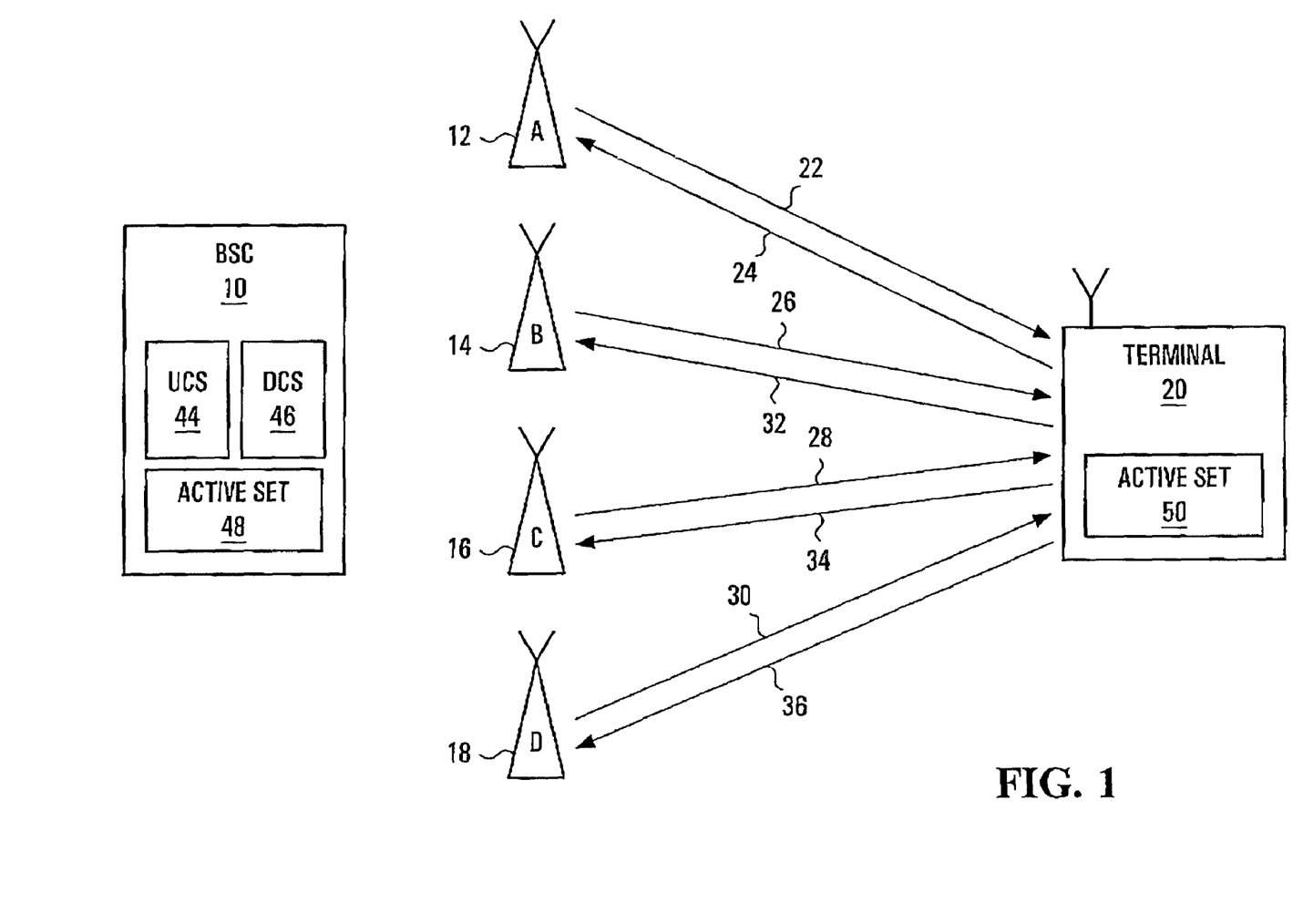
FIG. 1 is a block diagram of a wireless cellular communication system.

Referring to FIG. 1, a block diagram of an example wireless communication system is shown. A base station controller (BSC) 10 communicates with four base stations 12, 14, 16, 18, denoted as "A", "B", "C", and "D" respectively in FIG. 1. (Although four base stations are shown in FIG. 1, there are more generally two or more base stations in the communication system). At any time, the base station A may transmit a signal to a terminal 20 over a downlink channel 22. The terminal 20 may transmit a signal to the base station A over an uplink channel 24. Similarly, any of the base stations B, C, or D may transmit a signal to the terminal 20 over a respective downlink channel 26, 28, and 30, and the terminal 20 may transmit a signal to any of the base stations B, C, or D over a respective uplink channel 32, 34, and 36.

The BSC 10 stores an uplink candidate set (UCS) 44 and a downlink candidate set (DCS) 46, each corresponding to the terminal. The UCS 44 contains identities of base stations which the BSC 10 will consider when assigning base stations for predominantly uplink communication with the terminal 20. The DCS 46 contains identities of base stations which the BSC 10 will consider when assigning base stations for predominantly downlink communication with the terminal 20. The generation of the UCS 44 and the DCS 46 is described in more detail below, with respect to FIG. 2. The BSC 10 also stores an active set 48 corresponding to the terminal 20. The active set 48 contains identities of base stations with which the terminal 20 is actively communicating. In the more general case where there is more than one terminal communicating with the base stations A, B, C, and D, the BSC 10 will store an uplink candidate set, a downlink candidate set, and an active set, for each terminal. The UCS 44, the DCS 46, and the active set 48 are stored in dynamic memory, preferably at the BSC 10 but alternatively at a separate location (not shown in FIG. 1) from which the BSC 10 can retrieve them.

Each terminal stores an active set 50 in dynamic memory. The active set 50 contains identities of base stations with which the terminal 20 is actively communicating, which should be the same as those identified in the active set 48.

The terminal 20 reports a channel quality for each downlink channel between itself and a base station within communication range of the terminal 20, either continuously or intermittently. The terminal 20 determines the channel quality for each downlink channel using any of several techniques well known to those skilled in the art. For example, the terminal 20 could compare a received signal strength of a pilot signal received from a base station with a known transmission signal strength of the pilot signal. The terminal 20 reports the channel quality of each downlink channel to a respective base station, and each base station then reports the channel quality of its respective downlink channel to the BSC 10.

Each base station reports a channel quality for the uplink channel between the base station and the terminal 20 (and for each other terminal with which the base station within communication range of the base station, not shown in FIG. 1). The base stations determine the channel quality of their respective uplink channels using any of several techniques well known to those skilled in the art. For example, each base station could monitor the quality of a Random Access Channel received from the terminal 20 during call initiation. Each base station reports to the BSC 10 the channel quality of its respective uplink channel with the terminal 20.

Figure 2:
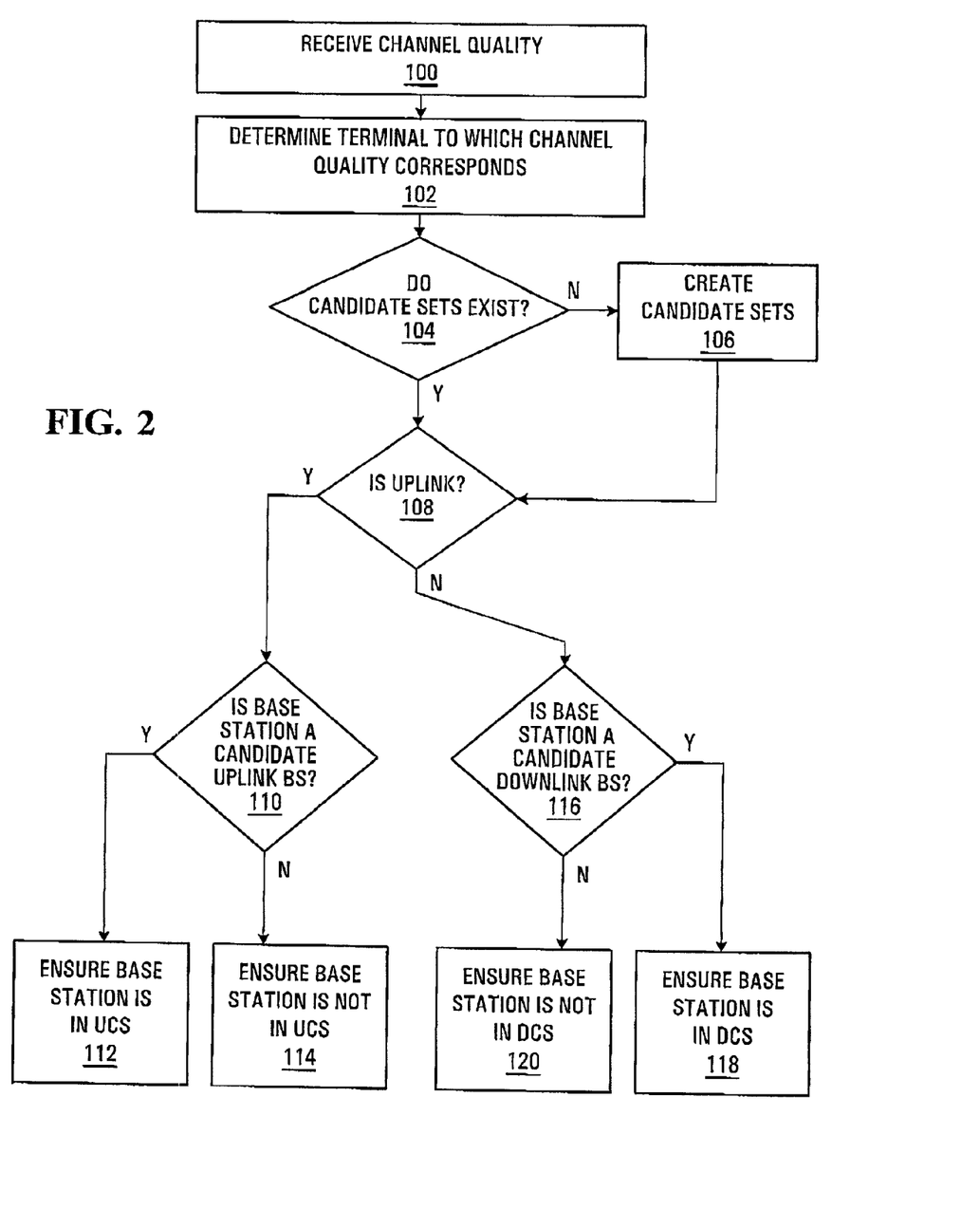
FIG. 2 is a flowchart of a method by which the base station controller (BSC) of FIG. 1 generates an uplink candidate set and a downlink candidate set according to one embodiment of the invention.

Referring to FIG. 2, a method by which the BSC 10 generates and maintains the UCS 44 and the DCS 46 for a terminal is shown. At step 100 the BSC 10 receives a channel quality from a base station. At step 102 the BSC 10 determines an identity of the terminal 20 to which the channel quality corresponds. The manner in which the base station identifies the terminal 20 to the BSC 10 will depend on the nature of the communication system and on proprietary signalling schemes, but is an elementary aspect of any such signalling scheme. At step 104 the BSC 10 determines whether a UCS and a DCS exist for the terminal 20. A UCS and a DCS candidate sets may not exist if the terminal 20 has just been powered on or, if the terminal 20 is mobile, the terminal 20 has just entered into communication range of a base station for which the BSC 10 is responsible. If the BSC 10 determines that a UCS and a DCS do not exist for the terminal 20, then at step 106 the BSC 10 creates an empty UCS and an empty DCS for the terminal 20.

At step 108 the BSC 10 determines whether the channel quality received at step 100 corresponds to an uplink channel or a downlink channel. If the channel quality corresponds to an uplink channel, the channel quality will have been determined by a base station, as described above. If the channel quality corresponds to a downlink channel, the channel quality will have been determined by the terminal 20, as described above. If the channel quality corresponds to an uplink channel, then at step 110 the BSC 10 determines whether the channel quality indicates that the base station to which the channel quality corresponds is a candidate uplink base station. A candidate uplink base station is a base station which the BSC 10 will consider when assigning a base station for predominantly uplink communication with the terminal 20. The BSC 10 determines whether the base station is a candidate uplink base station in any of several ways known to those skilled in the art, except that only the channel quality of the uplink channel will be considered, and not the channel quality of the downlink channel between the base station and the terminal 20. For example, the BSC 10 may simply determine whether the channel quality is above a configured threshold. As another example, the BSC 10 may store up to a configurable maximum number of base stations in the UCS 44, and may determine that the base station is a candidate uplink base station if the channel quality is higher than at least one channel quality of the base stations already listed in the UCS 44.

If the BSC determines at step 110 that the base station is a candidate uplink base station, then at step 112 the BSC ensures that the base station is present in the UCS 44 by adding the base station to the UCS 44 unless the base station is already listed in the UCS 44. If the BSC 10 determines at step 110 that the base station is not a candidate uplink base station, then at step 114 the BSC 10 ensures that the base station is not present in the UCS 44 by removing the base station from the UCS 44 if present.

If the BSC 10 determines at step 108 that the channel quality received at step 100 corresponds to a downlink channel, then at step 116 the BSC 10 determines whether the channel quality indicates that the base station to which the channel quality corresponds is a candidate downlink base station. A candidate downlink base station is a base station which the BSC 10 will consider when assigning a base station for predominantly downlink communication with the terminal 20. The BSC determines whether the base station is a candidate downlink base station in any of several ways known to those skilled in the art, except that only the channel quality corresponding to the downlink channel will be considered, and not the channel quality of the uplink channel between the base station and the terminal 20. For example, the BSC 10 may simply determine whether the channel quality is above a configured threshold. As another example, the BSC 10 may store up to a configurable maximum number of base stations in the DCS 46, and may determine that the base station is a candidate downlink base station if the channel quality is higher than at least one channel quality of the base stations already listed in the DCS 46.

If the BSC 10 determines at step 116 that the base station is a candidate downlink base station, then at step 118 the BSC 10 ensures that the base station is present in the DCS 46 by adding the base station to the DCS 46 unless the base station is already present in the DCS 46. If the BSC 10 determines at step 116 that the base station is not a candidate downlink base station, then at step 120 the BSC 10 ensures that the base station is not present in the DCS 46 by removing the base station from the DCS 46 if present.

Figure 3:
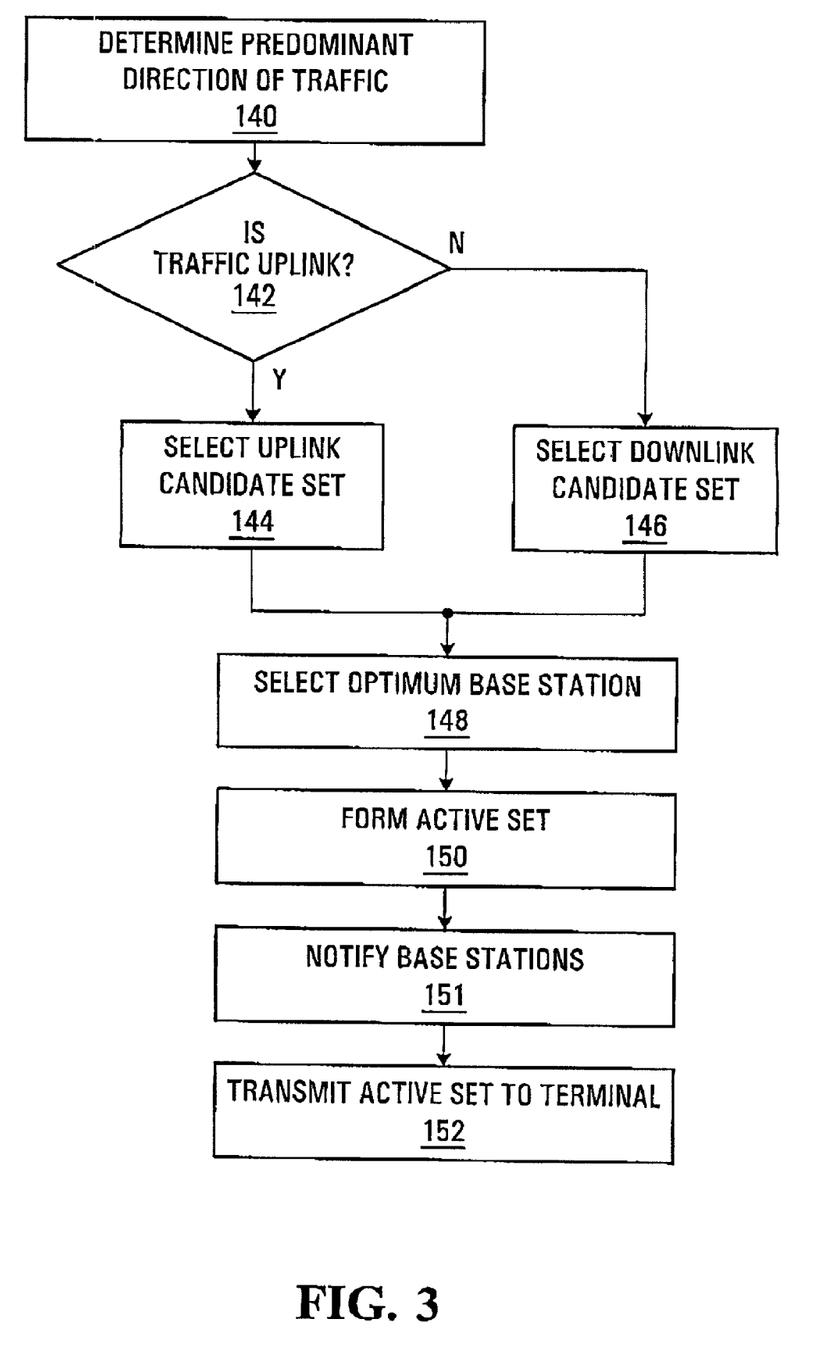
FIG. 3 is a flowchart of a method by which the BSC of FIG. 1 determines an optimum base station for communicating with a terminal.

Referring to FIG. 3, a method by which the BSC 10 of FIG. 1 determines one or more optimum base stations for communicating with a terminal is shown. The method is executed any time a new optimum base station must be determined. As examples, the BSC 10 may determine an optimum base station when first assuming responsibility for a new or existing call, or when a channel quality of a channel over which an existing call is communicating degrades to the point that a soft handoff is required. At step 140 the BSC 10 determines the predominant direction of traffic in the call. The BSC 10 preferably determines the predominant direction of traffic from the type of call. For example, the BSC 10 may determine that the predominant direction of traffic is in the downlink direction if the call is a request to browse the World Wide Web. As another example, the BSC 10 may determine that the predominant direction of traffic is in the uplink direction if the call is a request by the terminal 20 to transmit a file.

At step 142 the BSC 10 determines whether the predominant direction of traffic in the call is in the uplink direction. If the predominant direction of traffic is in the uplink direction, then at step 144 the BSC 10 selects the UCS 44. If at step 142 the BSC 10 determines that the predominant direction of traffic in the call is in the downlink direction, then at step 146 the BSC 10 selects the DCS 46.

As an alternative to steps 140 and 142, the BSC 10 may be informed by a base station as to whether an uplink channel or a downlink channel is required, such as occurs when a base station requests a soft handoff. For example, the base station may signal to the BSC 10 that the channel quality of the downlink channel to the terminal 20 has degraded to the point that a soft handoff is required. The BSC 10 would then simply select the DCS 46 at step 146. If the base station signals to the BSC 10 that the channel quality of the uplink channel to the terminal 20 has degraded to the point that a soft handoff is required, the BSC 10 would select the UCS 44 at step 144.

At step 148 the BSC 10 selects at least one optimum base station from the candidate set selected at step 144 or step 146. More than one optimum base station may be selected if the terminal 20 communicates with more than one base station simultaneously, as might occur in communication systems employing Code Division Multiple Access. The at least one optimum base station is preferably selected so as to balance the loads on all the base stations as much as possible, for example by selecting from the candidate set the base stations having the lowest current load. Alternatively, the BSC 10 may simply select one or more base stations at random from the candidate set selected at step 144 or 146. At step 150 the BSC 10 forms an active set from the at least one optimum base station selected at step 148. At step 151 the BSC 10 notifies the at least one base station in the active set that the at least one base station in the active set will be communicating with the terminal 20. At step 152 the BSC 10 transmits the active set to the terminal 20 via one or more of the base stations listed in the active set.

Figure 4:
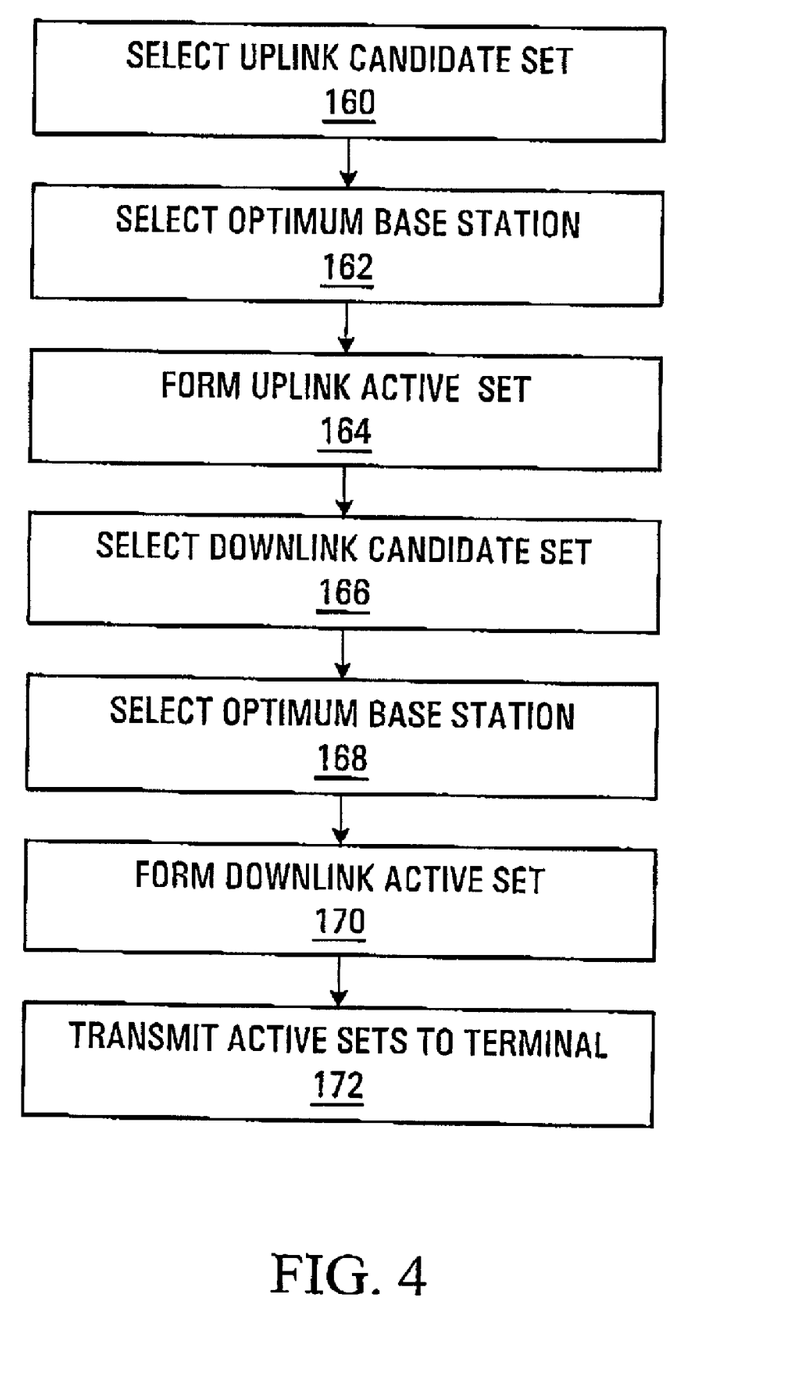
FIG. 4 is a flowchart of an alternate method by which the BSC of FIG. 1 determines optimum base stations for communicating with a terminal.

The terminal 20 may communicate with one or more base stations for uplink traffic and a different one or more base stations for downlink traffic. Referring to FIG. 4, an alternate method of selecting at least one optimum base station is shown. At step 160 the BSC 10 selects the uplink candidate set. At step 162 the BSC 10 selects at least one optimum uplink base station from the uplink candidate set. More than one optimum uplink base station may be selected if the terminal 20 communicates with more than one base station in the uplink direction simultaneously, as might occur in communication systems employing Code Division Multiple Access. At step 164 the BSC 10 forms an uplink active set from the at least one optimum uplink base station. At step 166 the BSC 10 selects the downlink candidate set. At step 168 the BSC 10 selects at least one optimum downlink base station from the downlink candidate set. At step 170 the BSC 10 forms a downlink active set from the at least one optimum downlink base station. The downlink active set and the uplink active set may have some base stations in common if the uplink candidate set and the downlink candidate set have some base stations in common. This might occur is both the uplink channel and the downlink channel between a base station and the terminal 20 had acceptable channel qualities. At step 172 the BSC 10 transmits the uplink active set and the downlink active set to the terminal 20 via one or more base stations. The BSC 10 and the terminal 20 each store both the uplink active set and the downlink active set.

The methods of FIGS. 2 to 4 are preferably implemented on the BSC 10 in the form of software instructions readable by a computer processor and stored on a computer-readable storage medium such as dynamic memory, floppy disk, or CD-ROM. Alternatively, the methods may be carried out by any computing apparatus containing logic for executing the described functionality. The computing apparatus may be a single processor, more than one processor, or a component of a larger processor. The logic may comprise external instructions or internal circuitry.

Methods described by flowcharts which are logically equivalent to the flowcharts described above are within the scope of the present invention. For example, in the method of FIG. 2, the step 104 of determining whether candidate sets exist for the terminal 20 may be carried out after the step 108 of determining whether the channel quality received at step 100 is a UCQ or a DCQ.

What has been described is merely illustrative of the application of the principles of the invention. Other arrangements and methods can be implemented by those skilled in the art without departing from the spirit and scope of the present invention.

We claim:

1. A method of selecting at least one base station for communicating with a terminal in a wireless communication system, comprising the steps of:
    storing an uplink candidate set listing at least one candidate uplink base station;
    storing a downlink candidate set listing at least one candidate downlink base station;
    determining a predominant direction of traffic with respect to the terminal;
    if the predominant direction of traffic is in an uplink direction, selecting at least one optimum base station from the uplink candidate set; and
    if the predominant direction of traffic is in a downlink direction, selecting at least one optimum base station from the downlink candidate set.

2. The method of claim 1 wherein the step of storing an uplink candidate set comprises the steps of:
    receiving a channel quality corresponding to a base station;
    determining whether the channel quality corresponds to an uplink channel;
    if the channel quality corresponds to an uplink channel, determining whether the base station is a candidate uplink base station;
    if the base station is a candidate uplink base station, ensuring that the base station is present in the uplink candidate set; and
    if the base station is not a candidate uplink base station, ensuring that the base station is not present in the uplink candidate set.

3. The method of claim 2 wherein the step of determining whether the base station is a candidate uplink base station determines that the base station is a candidate uplink base station if the channel quality is above a threshold.

4. The method of claim 1 wherein the step of storing a downlink candidate set comprises the steps of:
    receiving a channel quality corresponding to a base station;
    determining whether the channel quality corresponds to a downlink channel;
    if the channel quality corresponds to a downlink channel, determining whether the base station is a candidate downlink base station;
    if the base station is a candidate downlink base station, ensuring that the base station is present in the downlink candidate set; and
    if the base station is not a candidate downlink base station, ensuring that the base station is not present in the downlink candidate set.

5. The method of claim 4 wherein the step of determining whether the base station is a candidate downlink base station determines that the base station is a candidate downlink base station if the channel quality is above a threshold.

6. The method of claim 1 comprising the further step of transmitting an identity of the at least one optimum base station to the terminal.

7. The method of claim 1 wherein the step of selecting at least one optimum base station from the uplink candidate set comprises the steps of:
    determining a current load of each base station in the uplink candidate set; and
    selecting from the uplink candidate set at least one optimum base station that has the lowest current load;
    and wherein the step of selecting at least one optimum base station from the downlink candidate set comprises the steps of:
    determining a current load of each base station in the downlink candidate set; and
    selecting from the downlink candidate set at least one optimum base station that has the lowest current load.

8. A base station controller adapted to carry out the method of claim 1.

9. An article of manufacture comprising a computer-readable storage medium encoded with computer executable instructions for:
    storing an uplink candidate set listing at least one candidate uplink base station;
    storing a downlink candidate set listing at least one candidate downlink base station;
    determining a predominant direction of traffic with respect to a terminal;

if the predominant direction of traffic is in an uplink direction, selecting at least one optimum base station from the uplink candidate set; and if the predominant direction of traffic is in a downlink direction, selecting at least one optimum base station from the downlink candidate set.

10. The article of manufacture of claim 9 wherein the instructions for storing an uplink candidate set comprise instructions for:

receiving a channel quality corresponding to a base station;

determining whether the channel quality corresponds to an uplink channel;

if the channel quality corresponds to an uplink channel, determining whether the base station is a candidate uplink base station;

if the base station is a candidate uplink base station, ensuring that the base station is present in the uplink candidate set; and if the base station is not a candidate uplink base station, ensuring that the base station is not present in the uplink candidate set.

11. The article of manufacture of claim 10 wherein the instructions for determining whether the base station is a candidate uplink base station determine that the base station is a candidate uplink base station if the channel quality is above a threshold.

12. The article of manufacture of claim 9 wherein the instructions for storing a downlink candidate set comprise instructions for:

receiving a channel quality corresponding to a base station;

determining whether the channel quality corresponds to a downlink channel;

if the channel quality corresponds to a downlink channel, determining whether the base station is a candidate downlink base station;

if the base station is a candidate downlink base station, ensuring that the base station is present in the downlink candidate set; and if the base station is not a candidate downlink base station, ensuring that the base station is not present in the downlink candidate set.

13. The article of manufacture of claim 12 wherein the instructions for determining whether the base station is a candidate downlink base station determine that the base station is a candidate downlink base station if the channel quality is above a threshold.

14. The article of manufacture of claim 9 further comprising instructions for transmitting an identity of the at least one optimum base station to the terminal.

15. The article of manufacture of claim 9 wherein the instructions for selecting at least one optimum base station from the uplink candidate set comprise instructions for:

determining a current load of each base station in the uplink candidate set; and selecting from the uplink candidate set at least one optimum base station that has the lowest current load;

and wherein the instructions for selecting at least one optimum base station from the downlink candidate set comprise instructions for:

determining a current load of each base station in the downlink candidate set; and selecting from the downlink candidate set at least one optimum base station that has the lowest current load.

* * * * *

UNITED STATES PATENT AND TRADEMARK OFFICE
CERTIFICATE OF CORRECTION

PATENT NO. : 7,756,520 B2
APPLICATION NO. : 09/977991
DATED : July 13, 2010
INVENTOR(S) : Bassam M. Hashem et al.

It is certified that error appears in the above-identified patent and that said Letters Patent is hereby corrected as shown below:

Column 7, line 26, "... might occur is both ...", should read --... might occur if both ...--; and
Column 8, line 54, "... link candidate sct; and ...", should read --... link candidate set; and ...--.

Signed and Sealed this
Twenty-eighth Day of December, 2010

David J. Kappos
*Director of the United States Patent and Trademark Office*